(12) United States Patent
Hayasaka et al.

(10) Patent No.: US 11,885,694 B2
(45) Date of Patent: Jan. 30, 2024

(54) TEMPERATURE SENSOR ELEMENT (71) Applicant: SUMITOMO CHEMICAL COMPANY, LIMITED, Tokyo (JP)

(72) Inventors: Megumi Hayasaka, Osaka (JP); Yuichiro Kunai, Toyonaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 262 days.

(21) Appl. No.: 17/419,573

(22) PCT Filed: Mar. 4, 2020

(86) PCT No.: PCT/JP2020/009084
§ 371 (c)(1),
(2) Date: Jun. 29, 2021

(87) PCT Pub. No.: WO2020/202999
PCT Pub. Date: Oct. 8, 2020

(65) Prior Publication Data
US 2021/0381905 A1    Dec. 9, 2021

(30) Foreign Application Priority Data

Mar. 29, 2019  (JP) ................................ 2019-068129

(51) Int. Cl.
*G01K 7/22*       (2006.01)
*H01C 7/04*       (2006.01)
(Continued)

(52) U.S. Cl.
CPC ............... *G01K 7/22* (2013.01); *B32B 15/08* (2013.01); *C08G 73/1039* (2013.01);
(Continued)

(58) Field of Classification Search
CPC ... G01K 7/22; G01K 7/16; G01K 7/18; C08G 73/1039; C08G 73/1067; C08G 73/0266;
(Continued)

(56) References Cited

U.S. PATENT DOCUMENTS 4,619,854 A     10/1986  Penttinen
2005/0106409 A1  5/2005  Kawaguchi et al.
(Continued)

FOREIGN PATENT DOCUMENTS

EP    3373310 A1    9/2018
JP    61-12975 A    1/1986
(Continued)

OTHER PUBLICATIONS

Taiwanese Office Action and Search Report for Taiwanese Application No. 109108695, dated Apr. 24, 2023, with an English translation.
(Continued)

*Primary Examiner* — Michael E. La Villa
(74) *Attorney, Agent, or Firm* — Birch, Stewart, Kolasch & Birch, LLP (57) ABSTRACT

There is provided a temperature sensor element including a pair of electrodes and a temperature-sensitive film disposed in contact with the pair of electrodes, in which the temperature-sensitive film includes a matrix resin and a plurality of conductive domains contained in the matrix resin, the conductive domains include a conjugated polymer and a dopant, and the number of structural units constituting the conjugated polymer is 65 or less.

3 Claims, 4 Drawing Sheets (51) Int. Cl.

| | |
|---|---|
| *H01C 17/065* | (2006.01) |
| *B32B 15/08* | (2006.01) |
| *C08L 79/08* | (2006.01) |
| *C08L 101/04* | (2006.01) |
| *C08G 73/10* | (2006.01) |
| *G01K 7/16* | (2006.01) |
| *C08L 101/12* | (2006.01) |
| *H01C 7/00* | (2006.01) |
| *G01K 7/18* | (2006.01) |
| *H01C 7/02* | (2006.01) |
| *C08G 73/02* | (2006.01) |
| *H01C 7/06* | (2006.01) |

(52) U.S. Cl.
CPC .......... *C08G 73/1067* (2013.01); *C08L 79/08* (2013.01); *C08L 101/04* (2013.01); *C08L 101/12* (2013.01); *G01K 7/16* (2013.01); *G01K 7/18* (2013.01); *H01C 7/003* (2013.01); *H01C 7/005* (2013.01); *H01C 7/008* (2013.01); *H01C 7/022* (2013.01); *H01C 7/027* (2013.01); *H01C 7/028* (2013.01); *H01C 7/041* (2013.01); *H01C 7/049* (2013.01); *H01C 17/06513* (2013.01); *H01C 17/06586* (2013.01); *C08G 73/0266* (2013.01); *H01C 7/04* (2013.01); *H01C 7/06* (2013.01); *Y10T 428/125* (2015.01); *Y10T 428/12507* (2015.01); *Y10T 428/12528* (2015.01); *Y10T 428/12535* (2015.01); *Y10T 428/12542* (2015.01); *Y10T 428/12556* (2015.01); *Y10T 428/12569* (2015.01); *Y10T 428/31678* (2015.04); *Y10T 428/31692* (2015.04)

(58) Field of Classification Search
CPC ........ C08L 79/08; C08L 79/02; C08L 101/04; C08L 101/12; H01C 7/049; H01C 7/04; H01C 7/06; H01C 7/003; H01C 7/005; H01C 7/008; H01C 7/022; H01C 7/027; H01C 7/028; H01C 7/041; H01C 17/06513; H01C 17/06586; B32B 15/08; Y10T 428/125; Y10T 428/12507; Y10T 428/12528; Y10T 428/12535; Y10T 428/12542; Y10T 428/12556; Y10T 428/12569; Y10T 428/31678; Y10T 428/31692

See application file for complete search history.

(56) References Cited

U.S. PATENT DOCUMENTS

| | | | |
|---|---|---|---|
| 2019/0185338 A1* | 6/2019 | Nakamura | ............... B32B 9/041 |
| 2019/0242758 A1* | 8/2019 | DeKam | ............ H01C 17/06526 |
| 2019/0331536 A1 | 10/2019 | Hioki et al. | |
| 2020/0020467 A1 | 1/2020 | Rentrop et al. | |

FOREIGN PATENT DOCUMENTS

| | | | |
|---|---|---|---|
| JP | 3-211702 | A | 9/1991 |
| JP | 3-255923 | A | 11/1991 |
| JP | 11-297506 | A | 10/1999 |
| JP | 2004-335738 | A | 11/2004 |
| JP | 2006-312673 | A | 11/2006 |
| JP | 2017-157671 | A | 9/2017 |
| JP | 6352517 | B1 | 7/2018 |
| JP | 2019-94410 | A | 6/2019 |
| TW | I651349 | B | 2/2019 |
| WO | WO 03/052777 | A1 | 6/2003 |
| WO | WO 2018/138993 | A1 | 8/2018 |

OTHER PUBLICATIONS

U.S. Appl. No. 17/419,562, filed Jun. 29, 2021.
U.S. Appl. No. 17/419,658, filed Jun. 29, 2021.
U.S. Appl. No. 17/419,582, filed Jun. 29, 2021.
U.S. Appl. No. 17/419,567, filed Jun. 29, 2021.
English machine translation of JP-2004-335738-A, published Nov. 25, 2004.
English machine translation of JP-2017-157671-A, published Sep. 7, 2017.
English machine translation of JP-3-211702-A, published Sep. 17, 1991.
English translation of the International Search Report, dated Jun. 9, 2020, International Application No. for PCT/JP2020/009081.
English translation of the International Search Report, dated Jun. 9, 2020, International Application No. for PCT/JP2020/009083.
English translation of the International Search Report, dated Jun. 9, 2020, International Application No. for PCT/JP2020/009085.
International Search Report, dated Jun. 2, 2020, International Application No. for PCT/JP2020/009082. with an English translation.
Japanese Office Action for Japanese Application No. 2020-023718, dated Jul. 4, 2023, with an English translation.
Japanese Office Action for Japanese Application No. 2020-023719, dated Jul. 4, 2023, with an English translation.
Taiwanese Office Action and Search Report for Taiwanese Application No. 109108693, dated Jun. 19, 2023, with an English translation.
International Search Report, issued in PCT/JP2020/009084, dated Jun. 2, 2020.
Taiwanese Office Action and Search Report for Taiwanese Application No. 109108698, dated Jun. 17, 2023, with an English translation.
Japanese Office Action for Japanese Application No. 2020-023717, dated Sep. 12, 2023, with an English translation.
Japanese Office Action (Including an English translation thereof) issued in Japanese Patent Application No. 2020-023716 dated Nov. 7, 2023.

* cited by examiner figure 1 figure 2 figure 3 figure 4 figure 5 figure 6

TEMPERATURE SENSOR ELEMENT

TECHNICAL FIELD

The present invention relates to a temperature sensor element.

BACKGROUND ART

There has been conventionally known a thermistor-type temperature sensor element including a temperature-sensitive film changed in electric resistance value due to the change in temperature. An inorganic semiconductor thermistor has been conventionally used in the temperature-sensitive film of such a thermistor-type temperature sensor element. Such an inorganic semiconductor thermistor is hard, and thus a temperature sensor element using the same is usually difficult to have flexibility.

Japanese Patent Laid-Open No. H3-255923 (Patent Literature 1) relates to a thermistor-type infrared detection element using a polymer semiconductor having NTC characteristics (Negative Temperature Coefficient; characteristics of the reduction in electric resistance value due to the rise in temperature). The infrared detection element detects infrared light by detecting the rise in temperature due to incident infrared light, in terms of the change in electric resistance value, and includes a pair of electrodes and a thin film formed from the polymer semiconductor containing an electronically conjugated organic polymer partially doped, as a component.

CITATION LIST

Patent Literature

Patent Literature 1: Japanese Patent Laid-Open No. H3-255923

SUMMARY OF INVENTION

Technical Problem

The thin film in the infrared detection element disclosed in Patent Literature 1 is formed by an organic substance, and thus flexibility can be imparted to the infrared detection element.

However, there is not considered about repeating stability of the electric resistance value (also referred to as "instruction value") exhibited by the temperature sensor element.

The repeating stability of the electric resistance value means an ability where, even in a case where the temperature of an object (for example, environment) to be measured by the temperature sensor element is varied, the same electric resistance value as the electric resistance value exhibited at the initial temperature can be exhibited when the temperature of the object reaches the same temperature as the initial temperature. In a case where, when the temperature of the object to be measured is changed and then reaches the same temperature as the initial temperature, the same electric resistance value as the electric resistance value exhibited at the initial temperature is exhibited or the difference in numerical value between these electric resistance values is small, even if occurs, the temperature sensor element can be said to be excellent in repeating stability of the electric resistance value.

An object of the present invention is to provide a thermistor-type temperature sensor element including a temperature-sensitive film including an organic substance, in which the temperature sensor element is excellent in repeating stability of the electric resistance value.

Solution to Problem

The present invention provides the following temperature sensor element.

[1] A temperature sensor element including a pair of electrodes and a temperature-sensitive film disposed in contact with the pair of electrodes, wherein
 the temperature-sensitive film includes a matrix resin and a plurality of conductive domains contained in the matrix resin,
 the conductive domains include a conjugated polymer and a dopant, and
 the number of structural units constituting the conjugated polymer is 65 or less.

[2] The temperature sensor element according to [1], wherein the conjugated polymer is a polyaniline-based polymer.

[3] The temperature sensor element according to [1] or [2], wherein the conjugated polymer has a molecular weight distribution of 1.2 or less.

Advantageous Effect of Invention

There can be provided a temperature sensor element excellent in repeating stability of the electric resistance value.

DESCRIPTION OF EMBODIMENTS

The temperature sensor element according to the present invention (hereinafter, also simply referred to as "temperature sensor element".) includes a pair of electrodes and a temperature-sensitive film disposed in contact with the pair of electrodes.

Figure 1:
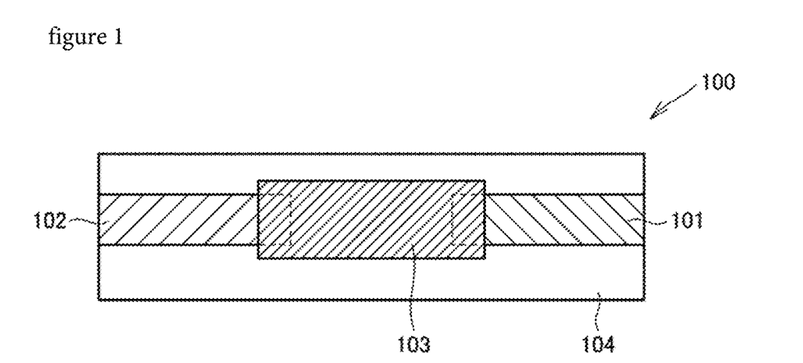
FIG. 1 is a schematic top view illustrating one example of the temperature sensor element according to the present invention.

FIG. 1 is a schematic top view illustrating one example of the temperature sensor element. A temperature sensor element 100 illustrated in FIG. 1 includes a pair of electrodes of a first electrode 101 and a second electrode 102, and a temperature-sensitive film 103 disposed in contact with both the first electrode 101 and the second electrode 102. The temperature-sensitive film 103, both ends of which are formed on the first electrode 101 and the second electrode 102, respectively, is thus in contact with such electrodes.

The temperature sensor element can further include a substrate 104 that supports the first electrode 101, the second electrode 102 and the temperature-sensitive film 103 (see FIG. 1).

The temperature sensor element 100 illustrated in FIG. 1 is a thermistor-type temperature sensor element where the temperature-sensitive film 103 detects the change in temperature, as an electric resistance value.

The temperature-sensitive film 103 has NTC characteristics that exhibit a decrease in electric resistance value due to the rise in temperature.

[1] First Electrode and Second Electrode

The first electrode 101 and the second electrode 102 here used are sufficiently small in electric resistance value as compared with the temperature-sensitive film 103. The respective electric resistance values of the first electrode 101 and the second electrode 102 included in the temperature sensor element are specifically preferably 500Ω or less, more preferably 200Ω or less, further preferably 100Ω or less at a temperature of 25° C.

The respective materials of the first electrode 101 and the second electrode 102 are not particularly limited as long as a sufficiently small electric resistance value is obtained as compared with that of the temperature-sensitive film 103, and such each material can be, for example, a metal single substance such as gold, silver, copper, platinum, or palladium; an alloy including two or more metal materials; a metal oxide such as indium tin oxide (ITO) or indium zinc oxide (IZO); or a conductive organic substance (for example, a conductive polymer).

The material of the first electrode 101 and the material of the second electrode 102 may be the same as or different from each other.

The respective methods of forming the first electrode 101 and the second electrode 102 are not particularly limited, and may be each a common method such as vapor deposition, sputtering, or coating (coating method). The first electrode 101 and the second electrode 102 can be each formed directly on the substrate 104.

The respective thicknesses of the first electrode 101 and the second electrode 102 are not particularly limited as long as a sufficiently small electric resistance value is obtained as compared with that of the temperature-sensitive film 103, and such each thickness is, for example, 50 nm or more and 1000 nm or less, preferably 100 nm or more and 500 nm or less.

[2] Substrate

The substrate 104 is a support that supports the first electrode 101, the second electrode 102 and the temperature-sensitive film 103.

The material of the substrate 104 is not particularly limited as long as the material is non-conductive (insulating), and the material can be, for example, a resin material such as a thermoplastic resin or an inorganic material such as glass. In a case where a resin material is used in the substrate 104, the temperature-sensitive film 103 typically has flexibility and thus flexibility can be imparted to the temperature sensor element.

The thickness of the substrate 104 is preferably set in consideration of flexibility, durability, and the like of the temperature sensor element. The thickness of the substrate 104 is, for example, 10 μm or more and 5000 μm or less, preferably 50 μm or more and 1000 μm or less.

[3] Temperature-Sensitive Film

Figure 2:
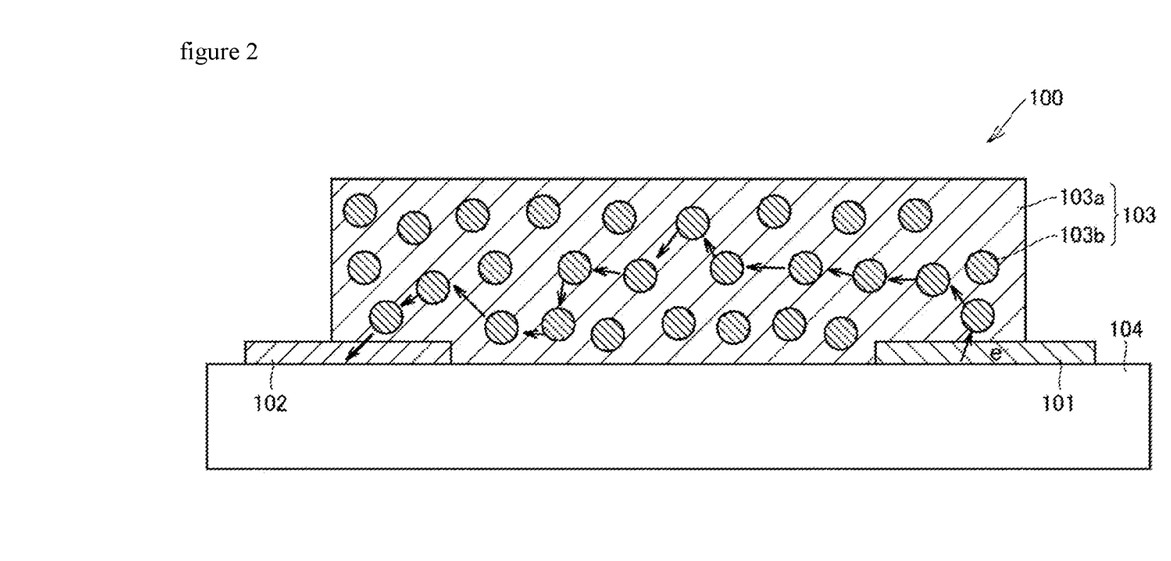
FIG. 2 is a schematic cross-sectional view illustrating one example of the temperature sensor element according to the present invention.

FIG. 2 is a schematic cross-sectional view illustrating one example of the temperature sensor element. A temperature-sensitive film 103 includes a matrix resin 103a and a plurality of conductive domains 103b contained in the matrix resin 103a in the temperature sensor element according to the present invention, as in a temperature sensor element 100 illustrated in FIG. 2. The plurality of conductive domains 103b are preferably dispersed in the matrix resin 103a.

The conductive domains 103b refer to a plurality of regions in the temperature-sensitive film 103 included in the temperature sensor element, which are contained in the matrix resin 103a and which contribute to electron transfer. The conductive domains 103b include a conductive polymer including a conjugated polymer and a dopant, and are preferably constituted by a conductive polymer.

[3-1] Conductive Polymer

The conductive polymer included in the conductive domains 103b includes a conjugated polymer and a dopant, and is preferably a conjugated polymer doped with a dopant.

A conjugated polymer by itself is usually extremely low in electric conductivity, and exhibits almost no electric conducting properties, for example, which correspond to $1 \times 10^{-6}$ S/m or less. The reason why a conjugated polymer by itself is low in electric conductivity is because the valance band is saturated with electrons and such electrons cannot be freely transferred. On the other hand, a conjugated polymer, in which electrons are delocalized, is thus remarkably low in ionization potential and very large in electron affinity as compared with a saturated polymer. Accordingly, a conjugated polymer easily allows charge transfer with an appropriate dopant such as an electron acceptor (acceptor) or an electron donor (donor) to occur, and such a dopant can withdraw an electron from the valance band of such a conjugated polymer or inject an electron to the conduction band thereof. Thus, such a conjugated polymer doped with a dopant, namely, the conductive polymer can have a few holes present in the valance band or a few electrons present in the conduction band to allow such holes and/or electrons to be freely transferred, and thus tends to be drastically enhanced in conductive properties.

The conductive polymer, which is a single substance, preferably has a value of linear resistance R in the range of 0.01Ω or more and 300 MΩ or less at a temperature of 25° C., as measured with an electric tester at a distance between lead bars of several mm to several cm.

The conjugated polymer constituting the conductive polymer is one having a conjugated structure in its molecule, and examples include a polymer having a backbone where a double bond and a single bond are alternately linked, and a polymer having an unshared pair of electrons conjugated.

Such a conjugated polymer can easily impart electric conducting properties by doping, as described above.

The conjugated polymer is not particularly limited, and examples thereof include polyacetylene; poly(p-phenylenevinylene); polypyrrole; polythiophene-based polymers such as poly(3,4-ethylenedioxythiophene) [PEDOT]; and polyaniline-based polymers (for example, polyaniline, and polyaniline having a substituent). The polythiophene-based polymer here means, for example, polythiophene, a polymer having a polythiophene backbone and having a side chain into which a substituent is introduced, and a polythiophene derivative. The "-based polymer" mentioned herein means a similar molecule.

The conjugated polymer may be used singly or in combinations of two or more kinds thereof.

In particular, a structural unit in the conductive polymer is important in the present invention, and the conjugated polymer is preferably a polyaniline-based polymer from the viewpoint of easiness of polymerization and identification.

The conjugated polymer for use in the present invention is one where the number of structural units constituting it is 65 or less. In a case where the number of structural units in the conjugated polymer is 65 or less, the temperature-sensitive film 103 where such conductive domains 103b including a conductive polymer formed from the conjugated polymer are contained in the matrix resin 103a tends to be higher in repeating stability of the electric resistance value. The reason for this is considered as follows.

In a case where the number of structural units in the conjugated polymer is 65 or less, a conductive polymer chain tends to be shorter. Such a short conductive polymer chain allows tanglement of the conductive polymer chain to be decreased, and thus the conductive domains 103b are independent from each other, and are smaller in size and are uniformly easily dispersed in the matrix resin 103a. As a result, the electric resistance detected by the temperature sensor element can be any electric resistance mainly derived from hopping conduction (electron transfer indicated by an arrow in FIG. 2) between the conductive domains. Thus, the influence of water or heat from the outside on the electric resistance value can be decreased. As described above, even in a case where the temperature of an object (for example, environment) to be measured by the temperature sensor element is varied, the temperature sensor element can exhibit a more reliable electric resistance value.

In a case where the number of structural units in the conjugated polymer is more than 65, sufficient repeating stability of the electric resistance value tends to be hardly obtained. One reason for this is considered because a long conductive polymer chain increases tanglement of the molecular chain and thus causes the conductive domains 103b to be larger in size and/or causes a plurality of such conductive domains to be easily contacted with each other, resulting in uneven dispersion of such conductive domains in the matrix resin 103a. It is thus considered that the electric resistance detected by the temperature sensor element does not correspond to the electric resistance mainly derived from hopping conduction between the conductive domains and thus the electric resistance value is easily varied due to water or heat from the outside.

The number of structural units in the conjugated polymer is calculated according to the following expression.

Number of structural units=Number average molecular weight Mn/Molecular weight of structural unit The number average molecular weight Mn of the conjugated polymer can be measured by gel permeation chromatography (GPC), and can be measured according to a method in [Examples] described below. In [Examples] described below, a measurement solution adopted is obtained by filtering a solution in which the conjugated polymer is dissolved, by a 0.45-μm membrane filter. The concentration of the conjugated polymer in the measurement solution is 0.01% by mass, and standard polystyrene is used as a molecular weight standard.

Each of such structural units is any structural unit derived from a raw material component. Examples of such each structural unit that can be included in the conjugated polymer are respective structures of polyacetylene, polyphenylene vinylene, polypyrrole, and polythiophene, and are shown below. In calculation of the number of structural units, the molecular weight of such each structural unit is as follows: polyacetylene: 26; polyphenylene vinylene: 102; polypyrrole: 65; and polythiophene: 82.

[Formula 1]

The number of structural units in the conjugated polymer is preferably 63 or less, more preferably 62 or less from the viewpoint of an enhancement in repeating stability of the electric resistance value. The number of structural units in the conjugated polymer can be, for example, 20 or more. The number is preferably 20 or more, more preferably 30 or more, further preferably 40 or more from the viewpoint that such a temperature-sensitive film 103 in which the conductive domains 103b are dispersed in the matrix resin 103a is easily formed.

The molecular weight distribution of the conjugated polymer is preferably 1.2 or less, more preferably 1.19 or less, further preferably 1.18 or less, still further preferably 1.17 or less. Thus, repeating stability of the electric resistance value can be enhanced. In addition, such a temperature-sensitive film 103 in which the conductive domains 103b are dispersed in the matrix resin 103a is easily formed.

The molecular weight distribution of the conjugated polymer is calculated from the number average molecular weight Mn and the weight average molecular weight Mw of the conjugated polymer, according to the following expression. The weight average molecular weight Mw of the conjugated polymer can be measured by the same method as in the number average molecular weight Mn.

Molecular weight distribution of conjugated polymer=Weight average molecular weight Mw/Number average molecular weight Mn Examples of the dopant include a compound serving as an electron acceptor (acceptor) from the conjugated polymer and a compound serving as an electron donor (donor) to the conjugated polymer.

The dopant serving as an electron acceptor is not particularly limited, and examples thereof include halogen such as $Cl_2$, $Br_2$, $I_2$, ICl, $ICl_3$, IBr, and $IF_3$; Lewis acids such as $PF_5$, $AsF_5$, $SbF_5$, $BF_3$, and $SO_3$; proton acids such as HCl, $H_2SO_4$, and $HClO_4$; transition metal halides such as $FeCl_3$, $FeBr_3$, and $SnCl_4$; and organic compounds such as tetracyanoethylene (TCNE), tetracyanoquinodimethane (TCNQ), 2,3-dichloro-5,6-dicyano-p-benzoquinone (DDQ), amino acids, polystyrenesulfonic acid, p-toluenesulfonic acid, and camphorsulfonic acid.

The dopant serving as an electron donor is not particularly limited, and examples thereof include alkali metals such as Li, Na, K, Rb, and Cs; alkali earth metals such as Be, Mg, Ca, Sc, Ba, Ag, Eu, and Yb, or other metals.

The dopant is preferably selected appropriately depending on the type of the conjugated polymer.

The dopant may be used singly or in combinations of two or more kinds thereof.

The content of the dopant in the temperature-sensitive film 103 is preferably 0.1 mol or more, more preferably 0.4 mol or more based on 1 mol of the conjugated polymer, from the viewpoint of conductive properties of the conductive polymer. The content is preferably 3 mol or less, more preferably 2 mol or less based on 1 mol of the conjugated polymer.

The content of the dopant in the temperature-sensitive film 103 is preferably 1% by mass or more, more preferably 3% by mass or more based on the mass of the temperature-sensitive film of 100% by mass, from the viewpoint of conductive properties of the conductive polymer. The content is preferably 60% by mass or less, more preferably 50% by mass or less relative to the temperature-sensitive film.

The electric conductivity of the conductive polymer is obtained by combining the electronic conductivity in a molecular chain, the electronic conductivity between molecular chains, and the electronic conductivity between fibrils.

Carrier transfer is generally described by a hopping conduction mechanism. An electron present at a localized level in a non-crystalline region can be jumped to an adjacent localized level by the tunneling effect, in a case where the distance between localized states is short. In a case where there is a difference in energy between localized states, a thermal excitation process depending on the difference in energy is required. The conduction due to tunneling with such a thermal excitation process corresponds to hopping conduction.

In a case where the density of states is high at a low temperature or in the vicinity of the Fermi level, hopping to a distal level, small in difference in energy, is more dominant than hopping to a proximal level, large in difference in energy. In such a case, a variable range hopping conduction model (Mott-VRH model) is applied.

Such hopping conduction is highly dependent on the temperature, as can be understood from a variable range hopping conduction model (Mott-VRH model). Accordingly, such hopping conduction can be dominant to result in an enhancement in temperature dependence of the electric resistance value exhibited by the temperature-sensitive film 103. As can be understood from a variable range hopping conduction model (Mott-VRH model), the conductive polymer has NTC characteristics that exhibit a decrease in electric resistance value due to the rise in temperature.

[3-2] Matrix Resin

The matrix resin 103a included in the temperature-sensitive film 103 is a matrix that allows the plurality of conductive domains 103b to be fixed into the temperature-sensitive film 103. The plurality of conductive domains 103b including the conductive polymer are contained in, preferably dispersed in the matrix resin 103a, resulting in a tendency to obtain a temperature sensor element that hardly causes defects such as cracks to occur in the temperature-sensitive film 103 in use of the temperature sensor element and that has such a temperature-sensitive film 103 excellent in stability over time.

Examples of the matrix resin 103a include a cured product of an active energy ray-curable resin, a cured product of a thermosetting resin, and a thermoplastic resin. In particular, a thermoplastic resin is preferably used. The matrix resin 103a is preferably one that is hardly affected by water and/or heat, from the viewpoint that the influence of water and/or heat from the outside on hopping conduction between the conductive domains 103b is more reduced.

The thermoplastic resin is not particularly limited, and examples thereof include polyolefin-based resins such as polyethylene and polypropylene; polyester-based resins such as polyethylene terephthalate; polycarbonate-based resins; (meth)acrylic resins; cellulose-based resins; polystyrene-based resins; polyvinyl chloride-based resins; acrylonitrile-butadiene-styrene-based resins; acrylonitrile-styrene-based resins; polyvinyl acetate-based resins; polyvinylidene chloride-based resins; polyamide-based resins; polyacetal-based resins; modified polyphenylene ether-based resins; polysulfone-based resins; polyethersulfone-based resins; polyarylate-based resins; and polyimide-based resins such as polyimide and polyamideimide.

The matrix resin 103a may be used singly or in combinations of two or more kinds thereof.

In particular, the matrix resin 103a is preferably high in polymer packing properties (also referred to as "molecular packing properties"). Such a matrix resin 103a high in molecular packing properties is used to thereby enable penetration of moisture into the temperature-sensitive film 103 to be effectively suppressed. Such suppression of penetration of moisture into the temperature-sensitive film 103 can enhance repeating stability of the electric resistance value of the temperature-sensitive film 103. Such suppression can also contribute to suppression of deterioration in measurement accuracy as indicated in the following 1) and 2).

1) If moisture is diffused in the temperature-sensitive film 103, an ion channel with water tends to be formed to result in an increase in electric conductivity due to ion conduction or the like. Such an increase in electric conductivity due to ion conduction or the like can cause a thermistor-type temperature sensor element that detects the change in temperature, as the electric resistance value, to be deteriorated in measurement accuracy.

2) If moisture is diffused in the temperature-sensitive film 103, the matrix resin 103a tends to be swollen to result in an increase in distance between the conductive domains 103b. This can lead to an increase in electric resistance value detected by the temperature sensor element, resulting in deterioration in measurement accuracy.

Such molecular packing properties are based on intermolecular interaction. Accordingly, one solution to enhance molecular packing properties of the matrix resin 103a is to introduce a functional group or moiety that easily results in intermolecular interaction, into a polymer chain.

Examples of the functional group or moiety include functional groups each capable of forming a hydrogen bond, such as a hydroxyl group, a carboxyl group, and an amino group, and functional groups or moieties (for example, moieties such as an aromatic ring) each capable of allowing π-π stacking interaction to occur.

In particular, in a case where a polymer capable of allowing π-π stacking interaction to occur is used in the matrix resin 103a, packing due to π-π stacking interaction is easily uniformly extended to the entire molecule and thus penetration of moisture into the temperature-sensitive film 103 can be more effectively suppressed.

In a case where a polymer capable of allowing π-π stacking interaction to occur is used in the matrix resin 103a, a moiety allowing intermolecular interaction to occur is hydrophobic and thus penetration of moisture into the temperature-sensitive film 103 can be more effectively suppressed.

A crystalline resin and a liquid crystalline resin also each have a highly ordered structure, and thus are each suitable as the matrix resin 103a high in molecular packing properties.

One resin preferably used as the matrix resin 103a is a polyimide-based resin from the viewpoint of heat resistance of the temperature-sensitive film 103, film formability of the temperature-sensitive film 103, and the like. Such a polyimide-based resin preferably includes an aromatic ring and more preferably includes an aromatic ring in a main chain because π-π stacking interaction easily occurs.

The polyimide-based resin can be obtained by, for example, reacting a diamine and a tetracarboxylic acid, or reacting an acid chloride in addition to them. The diamine and the tetracarboxylic acid here also include respective derivatives. The "diamine" simply designated herein means any diamine and any derivative thereof, and the "tetracarboxylic acid" simply designated herein also means any derivative thereof again.

The diamine and the tetracarboxylic acid may be each used singly or in combinations of two or more kinds thereof.

Examples of the diamine include diamine and diaminodisilane, and preferably diamine.

Examples of the diamine include an aromatic diamine, an aliphatic diamine, or a mixture thereof, and preferably include an aromatic diamine. The aromatic diamine can be used to provide a polyimide-based resin where π-π stacking can be made.

The aromatic diamine refers to a diamine where an amino group is directly bound to an aromatic ring, and the structure thereof may partially include an aliphatic group, an alicyclic group or other substituent. The aliphatic diamine refers to a diamine where an amino group is directly bound to an aliphatic group or an alicyclic group, and the structure thereof may partially include an aromatic group or other substituent.

An aliphatic diamine having an aromatic group in a portion of the structure can also be used to provide a polyimide-based resin where π-π stacking can be made.

Examples of the aromatic diamine include phenylenediamine, diaminotoluene, diaminobiphenyl, bis(aminophenoxy)biphenyl, diaminonaphthalene, diaminodiphenyl ether, bis[(aminophenoxy)phenyl]ether, diaminodiphenyl sulfide, bis[(aminophenoxy)phenyl]sulfide, diaminodiphenyl sulfone, bis[(aminophenoxy)phenyl]sulfone, diaminobenzophenone, diaminodiphenylmethane, bis[(aminophenoxy)phenyl]methane, bisaminophenylpropane, bis[(aminophenoxy)phenyl]propane, bisaminophenoxybenzene, bis[(amino-α,α'-dimethylbenzyl)]benzene, bisaminophenyldiisopropylbenzene, bisaminophenylfluorene, bisaminophenylcyclopentane, bisaminophenylcyclohexane, bisaminophenylnorbornane, bisaminophenyladamantane, and such any compound where one or more hydrogen atoms of the compound are each replaced with a fluorine atom or a hydrocarbon group including a fluorine atom (trifluoromethyl group or the like).

The aromatic diamine may be used singly or in combinations of two or more kinds thereof.

Examples of the phenylenediamine include m-phenylenediamine and p-phenylenediamine.

Examples of the diaminotoluene include 2,4-diaminotoluene and 2,6-diaminotoluene.

Examples of the diaminobiphenyl include benzidine (another name: 4,4'-diaminobiphenyl), o-tolidine, m-tolidine, 3,3'-dihydroxy-4,4'-diaminobiphenyl, 2,2-bis(3-amino-4-hydroxyphenyl)propane (BAPA), 3,3'-dimethoxy-4,4'-diaminobiphenyl, 3,3'-dichloro-4,4'-diaminobiphenyl, 2,2'-dimethyl-4,4'-diaminobiphenyl, and 3,3'-dimethyl-4,4'-diaminobiphenyl.

Examples of the bis(aminophenoxy)biphenyl include 4,4'-bis(4-aminophenoxy)biphenyl (BAPB), 3,3'-bis(4-aminophenoxy)biphenyl, 3,4'-bis(3-aminophenoxy)biphenyl, 4,4'-bis(2-methyl-4-aminophenoxy)biphenyl, 4,4'-bis(2,6-dimethyl-4-aminophenoxy)biphenyl, and 4,4'-bis(3-aminophenoxy) biphenyl.

Examples of the diaminonaphthalene include 2,6-diaminonaphthalene and 1,5-diaminonaphthalene.

Examples of the diaminodiphenyl ether include 3,4'-diaminodiphenyl ether and 4,4'-diaminodiphenyl ether.

Examples of the bis[(aminophenoxy)phenyl]ether include bis[4-(3-aminophenoxy)phenyl]ether, bis[4-(4-aminophenoxy)phenyl]ether, bis[3-(3-aminophenoxy)phenyl]ether, bis(4-(2-methyl-4-aminophenoxy)phenyl)ether, and bis(4-(2,6-dimethyl-4-aminophenoxy)phenyl) ether.

Examples of the diaminodiphenyl sulfide include 3,3'-diaminodiphenyl sulfide, 3,4'-diaminodiphenyl sulfide, and 4,4'-diaminodiphenyl sulfide.

Examples of the bis[(aminophenoxy)phenyl]sulfide include bis[4-(4-aminophenoxy)phenyl]sulfide, bis[3-(4-aminophenoxy)phenyl] sulfide, bis[4-(3-aminophenoxy)phenyl]sulfide, bis[3-(4-aminophenoxy)phenyl]sulfide, and bis[3-(3-aminophenoxy)phenyl]sulfide.

Examples of the diaminodiphenyl sulfone include 3,3'-diaminodiphenyl sulfone, 3,4'-diaminodiphenyl sulfone, and 4,4'-diaminodiphenyl sulfone.

Examples of the bis[(aminophenoxy)phenyl]sulfone include bis[3-(4-aminophenoxy)phenyl]sulfone, bis[4-(4-aminophenyl)]sulfone, bis[3-(3-aminophenoxy)phenyl] sulfone, bis[4-(3-aminophenyl)]sulfone, bis[4-(4-aminophenoxy)phenyl]sulfone, bis[4-(2-methyl-4-aminophenoxy)phenyl]sulfone, and bis[4-(2,6-dimethyl-4-aminophenoxy)phenyl]sulfone.

Examples of the diaminobenzophenone include 3,3'-diaminobenzophenone and 4,4'-diaminobenzophenone.

Examples of the diaminodiphenylmethane include 3,3'-diaminodiphenylmethane, 3,4'-diaminodiphenylmethane, and 4,4'-diaminodiphenylmethane.

Examples of the bis[(aminophenoxy)phenyl]methane include bis[4-(3-aminophenoxy)phenyl]methane, bis[4-(4-aminophenoxy)phenyl]methane, bis[3-(3-aminophenoxy)phenyl]methane, and bis[3-(4-aminophenoxy)phenyl] methane.

Examples of the bisaminophenylpropane include 2,2-bis(4-aminophenyl)propane, 2,2-bis(3-aminophenyl)propane, 2-(3-aminophenyl)-2-(4-aminophenyl)propane, 2,2-bis(2-methyl-4-aminophenyl)propane, and 2,2-bis(2,6-dimethyl-4-aminophenyl)propane.

Examples of the bis[(aminophenoxy)phenyl]propane include 2,2-bis[4-(2-methyl-4-aminophenoxy)phenyl]propane, 2,2-bis[4-(2,6-dimethyl-4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]propane, and 2,2-bis[3-(4-aminophenoxy)phenyl] propane.

Examples of the bisaminophenoxybenzene include 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,4-bis(2-methyl-4-aminophenoxy)benzene, 1,4-bis(2,6-dimethyl-4-aminophenoxy)benzene, 1,3-bis(2-methyl-4-aminophenoxy)benzene, and 1,3-bis(2,6-dimethyl-4-aminophenoxy)benzene.

Examples of the bis(amino-α,α'-dimethylbenzyl)benzene (another name: bisaminophenyldiisopropylbenzene) include 1,4-bis(4-amino-α,α'-dimethylbenzyl)benzene (BiSAP, another name: α,α'-bis(4-aminophenyl)-1,4-diisopropylbenzene), 1,3-bis[4-(4-amino-6-methylphenyl)-α,α'-dimethylbenzyl]benzene, α,α'-bis(2-methyl-4-aminophenyl)-1,4-diisopropylbenzene, α,α'-bis(2,6-dimethyl-4-aminophenyl)-1,4-diisopropylbenzene, α,α'-bis(3-aminophenyl)-1,4-diisopropylbenzene, α,α'-bis(4-aminophenyl)-1,3-diisopropylbenzene, α,α'-bis(2-methyl-4-aminophenyl)-1,3-diisopropylbenzene, α,α'-bis(2,6-dimethyl-4-aminophenyl)-1,3-diisopropylbenzene, and α,α'-bis(3-aminophenyl)-1,3-diisopropylbenzene.

Examples of the bisaminophenyl fluorene include 9,9-bis(4-aminophenyl)fluorene, 9,9-bis(2-methyl-4-aminophenyl)fluorene, and 9,9-bis(2,6-dimethyl-4-aminophenyl)fluorene.

Examples of the bisaminophenylcyclopentane include 1,1-bis(4-aminophenyl)cyclopentane, 1,1-bis(2-methyl-4-aminophenyl)cyclopentane, and 1,1-bis(2,6-dimethyl-4-aminophenyl)cyclopentane.

Examples of the bisaminophenylcyclohexane include 1,1-bis(4-aminophenyl)cyclohexane, 1,1-bis(2-methyl-4-aminophenyl)cyclohexane, 1,1-bis(2,6-dimethyl-4-aminophenyl)cyclohexane, and 1,1-bis(4-aminophenyl)4-methylcyclohexane.

Examples of the bisaminophenylnorbornane include 1,1-bis(4-aminophenyl)norbornane, 1,1-bis(2-methyl-4-aminophenyl)norbornane, and 1,1-bis(2,6-dimethyl-4-aminophenyl)norbornane.

Examples of the bisaminophenyladamantane include 1,1-bis(4-aminophenyl)adamantane, 1,1-bis(2-methyl-4-aminophenyl)adamantane, and 1,1-bis(2,6-dimethyl-4-aminophenyl)adamantane.

Examples of the aliphatic diamine include ethylenediamine, hexamethylenediamine, polyethylene glycol bis(3-aminopropyl)ether, polypropylene glycol bis(3-aminopropyl)ether, 1,3-bis(aminomethyl)cyclohexane, 1,4-bis(aminomethyl)cyclohexane, m-xylylenediamine, p-xylylenediamine, 1,4-bis(2-amino-isopropyl)benzene, 1,3-bis(2-amino-isopropyl)benzene, isophoronediamine, norbornanediamine, siloxanediamines, and such any compound where one or more hydrogen atoms of the compound are each replaced with a fluorine atom or a hydrocarbon group including a fluorine atom (trifluoromethyl group or the like).

The aliphatic diamine may be used singly or in combinations of two or more kinds thereof.

Examples of the tetracarboxylic acid include tetracarboxylic acid, tetracarboxylic acid esters, and tetracarboxylic dianhydride, and preferably include tetracarboxylic dianhydride.

Examples of the tetracarboxylic dianhydride include tetracarboxylic dianhydrides such as pyromellitic dianhydride, 3,3',4,4'-benzophenonetetracarboxylic dianhydride, 1,4-hydroquinonedibenzoate-3,3',4,4'-tetracarboxylic dianhydride, 3,3',4,4'-biphenyltetracarboxylic dianhydride, 3,3',4,4'-diphenyl ether tetracarboxylic dianhydride (ODPA), 1,2,4,5-cyclohexanetetracarboxylic dianhydride (HPMDA), 1,2,3,4-cyclobutanetetracarboxylic dianhydride, 1,2,4,5-cyclopentanetetracarboxylic dianhydride, bicyclo[2,2,2]oct-7-ene-2,3,5,6-tetracarboxylic dianhydride, 2,3,3',4'-biphenyltetracarboxylic dianhydride, 3,3',4, 4'-benzophenonetetracarboxylic dianhydride, 4,4-(p-phenylenedioxy)diphthalic dianhydride, and 4,4-(m-phenylenedioxy)diphthalic dianhydride; and 2,2-bis(3,4-dicarboxyphenyl)propane, 2,2-bis(2,3-dicarboxyphenyl)propane, bis(3,4-dicarboxyphenyl)sulfone, bis(3,4-dicarboxyphenyl)ether, bis(2,3-dicarboxyphenyl)ether, 1,1-bis(2,3-dicarboxyphenyl)ethane, bis(2,3-dicarboxyphenyl)methane, and bis(3,4-dicarboxyphenyl)methane.

Examples of the tetracarboxylic dianhydride also include such any compound described above, where one or more hydrogen atoms of the compound are each replaced with a fluorine atom or a hydrocarbon group including a fluorine atom (trifluoromethyl group or the like). The tetracarboxylic dianhydride may be used singly or in combinations of two or more kinds thereof.

Examples of the acid chloride include respective acid chlorides of a tetracarboxylic acid compound, a tricarboxylic acid compound, and a dicarboxylic acid compound, and in particular, an acid chloride of a dicarboxylic acid compound is preferably used. Examples of the acid chloride of a dicarboxylic acid compound include 4,4'-oxybis(benzoyl chloride) [OBBC] and terephthaloyl dichloride (TPC).

In a case where the matrix resin 103a includes a fluorine atom, penetration of moisture into the temperature-sensitive film 103 tends to be capable of being more effectively suppressed. A polyimide-based resin including a fluorine atom can be prepared by using one where at least any one of a diamine and a tetracarboxylic acid for use in preparation includes a fluorine atom.

One example of such a diamine including a fluorine atom is 2,2'-bis(trifluoromethyl)benzidine (TFMB). One example of such a tetracarboxylic acid including a fluorine atom is 4,4'-(1,1,1,3,3,3-hexafluoropropane-2,2-diyl)diphthalic dianhydride (6FDA).

The weight average molecular weight of the polyimide-based resin is preferably 20000 or more, more preferably 50000 or more, and preferably 1000000 or less, more preferably 500000 or less.

The weight average molecular weight can be determined with a size exclusion chromatography apparatus.

The matrix resin 103a preferably includes 50% by mass or more, more preferably 70% by mass or more, further preferably 90% by mass or more, still further preferably 95% by mass or more, particularly preferably 100% by mass of the polyimide-based resin, based on the total resin components of 100% by mass constituting the matrix resin. The polyimide-based resin is preferably a polyimide-based resin including an aromatic ring, more preferably, a polyimide-based resin including an aromatic ring and a fluorine atom.

On the other hand, the matrix resin 103a preferably has the property of easily forming a film from the viewpoint of film formability. In one example thereof, the matrix resin 103a is preferably a soluble resin excellent in wet film formability. A resin structure imparting the property is, for example, one having a properly bent structure in a main chain, and such a structure is obtained by, for example, a method involving allowing the main chain to contain an ether bond to thereby impart a bent structure, and a method involving introducing a substituent such as an alkyl group into the main chain to thereby impart a bent structure based on the steric hindrance.

[3-3] Configuration of Temperature-Sensitive Film

The temperature-sensitive film 103 has a configuration that includes the matrix resin 103a and the plurality of conductive domains 103b contained in the matrix resin 103a. The plurality of conductive domains 103b are preferably dispersed in the matrix resin 103a. The conductive domains 103b include a conductive polymer including a conjugated polymer and a dopant, and are preferably constituted by a conductive polymer.

The total content of the conjugated polymer and the dopant in the temperature-sensitive film 103 is preferably 90% by mass or less based on 100% by mass of the total amount of the matrix resin 103a, the conjugated polymer and the dopant, from the viewpoint of effective suppression of penetration of moisture into the temperature-sensitive film 103. The total content of the conjugated polymer and the dopant is more preferably 80% by mass or less, further preferably 70% by mass or less, still further preferably 60% by mass or less. If the total content of the conjugated polymer and the dopant is more than 90% by mass, the content of the matrix resin 103a in the temperature-sensitive film 103 is low, resulting in a tendency to deteriorate the effect of suppressing penetration of moisture into the temperature-sensitive film 103.

The total content of the conjugated polymer and the dopant in the temperature-sensitive film 103 is preferably 5% by mass or more based on 100% by mass of the total amount of the matrix resin 103a, the conjugated polymer and the dopant, from the viewpoint of a reduction in power consumption of the temperature sensor element and from the viewpoint of a normal operation of the temperature sensor element. The total content of the conjugated polymer and the dopant is more preferably 10% by mass or more, further preferably 20% by mass or more, still further preferably 30% by mass or more.

A low total content of the conjugated polymer and the dopant results in a tendency to increase the electric resistance, sometimes leading to an increase in current necessary for measurement and thus a remarkably increase in power consumption. A low total content of the conjugated polymer and the dopant also sometimes provides no communication between the electrodes. A low total content of the conjugated polymer and the dopant sometimes causes Joule heat to be generated depending on the current flowing, and also sometimes makes temperature measurement by itself difficult. Accordingly, the total content of the conjugated polymer and the dopant, which enables the conductive polymer to be formed, is preferably in the above range.

The thickness of the temperature-sensitive film 103 is not particularly limited, and is, for example, 0.3 µm or more and 50 µm or less. The thickness of the temperature-sensitive film 103 is preferably 0.3 µm or more and 40 µm or less from the viewpoint of flexibility of the temperature sensor element.

[3-4] Production of Temperature-Sensitive Film

The temperature-sensitive film 103 is obtained by stirring and mixing the conjugated polymer, the dopant, the matrix resin (for example, thermoplastic resin), and a solvent to thereby prepare a polymer composition for a temperature-sensitive film, and forming the composition into a film. Examples of the film formation method include a method involving applying the polymer composition for a temperature-sensitive film onto the substrate 104, and then drying and, if necessary, heat-treating the resultant. The method of applying the polymer composition for a temperature-sensitive film is not particularly limited, and examples include a spin coating method, a screen printing method, an ink-jet printing method, a dip coating method, an air knife coating method, a roll coating method, a gravure coating method, a blade coating method, and a dropping method.

In a case where the matrix resin 103a is formed from an active energy ray-curable resin or a thermosetting resin, a curing treatment is further applied. In a case where an active energy ray-curable resin or a thermosetting resin is used, no solvent may be required to be added to the polymer composition for a temperature-sensitive film, and in this case, no drying treatment is also required.

The polymer composition for a temperature-sensitive film usually allows the conjugated polymer and the dopant to form conductive polymer domains (conductive domains) and such domains are dispersed in the composition.

The content of the matrix resin in the polymer composition (excluding the solvent) for a temperature-sensitive film is preferably substantially the same as the content of the matrix resin in the temperature-sensitive film 103 formed from the composition. The content of each component included in the polymer composition for a temperature-sensitive film corresponds to the content of each component relative to the total of each component in the polymer composition for a temperature-sensitive film, excluding the solvent, and is preferably substantially the same as the content of each component in the temperature-sensitive film 103 formed from the polymer composition for a temperature-sensitive film.

The solvent included in the polymer composition for a temperature-sensitive film is preferably a solvent that can dissolve the conjugated polymer, the dopant and the matrix resin, from the viewpoint of film formability.

The solvent is preferably selected depending on, for example, the solubilities in the conjugated polymer, the dopant and the matrix resin used.

Examples of such a usable solvent include N-methyl-2-pyrrolidone, N,N-dimethylacetamide, N,N-diethylacetamide, N,N-dimethylformamide, N,N-diethylformamide, N-methylcaprolactam, N-methylformamide, N,N,2-trimethylpropionamide, hexamethylphosphoramide, tetramethylenesulfone, dimethylsulfoxide, m-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, 1,4-dioxane, ε-caprolactam, dichloromethane, and chloroform.

The solvent may be used singly or in combinations of two or more kinds thereof.

The polymer composition for a temperature-sensitive film may include one or more additives such as an antioxidant, a flame retardant, a plasticizer, and an ultraviolet absorber.

The total content of the conjugated polymer, the dopant and the matrix resin in the polymer composition for a temperature-sensitive film is preferably 90% by mass or more based on the solid content (all components other than the solvent) of the polymer composition for a temperature-sensitive film, of 100% by mass. The total content is more preferably 95% by mass or more, further preferably 98% by mass or more, and may be 100% by mass.

[4] Temperature Sensor Element

The temperature sensor element can include any constituent component other than the above constituent components. Examples of such other constituent component include those commonly used for temperature sensor elements, such as an electrode, an insulation layer, and a sealing layer that seals the temperature-sensitive film.

Figure 3:
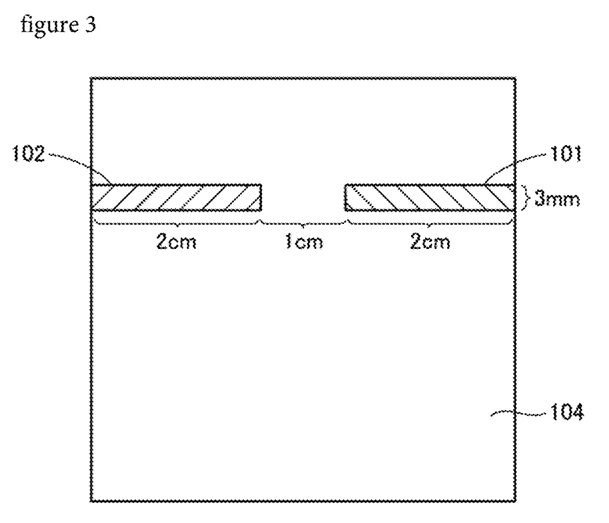
FIG. 3 is a schematic top view illustrating a method of producing a temperature sensor element of Example 1.
Figure 4:
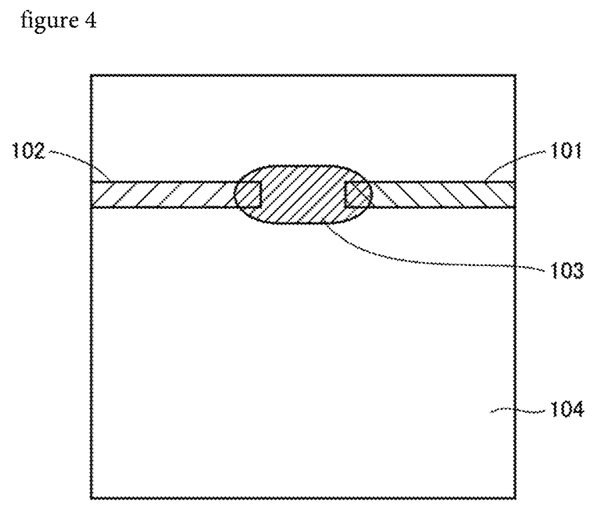
FIG. 4 is a schematic top view illustrating the method of producing the temperature sensor element of Example 1.

The temperature sensor element including the temperature-sensitive film is excellent in repeating stability of the electric resistance value. The repeating stability of the electric resistance value can be evaluated according to the following method. First, a pair of Au electrodes is formed on one surface of a glass substrate, as illustrated in FIG. 3, and thereafter, the temperature-sensitive film is formed so as to be in contact with both the electrodes, thereby producing the temperature sensor element, as illustrated in FIG. 4.

Next, the pair of Au electrodes of the temperature sensor element and a commercially available digital multimeter are connected with a lead wire or the like, and the temperature of the temperature sensor element is adjusted by using a commercially available Peltier temperature controller. Thereafter, the average electric resistance value at each temperature of a plurality of temperatures is measured. In Examples, the measurement is performed at eight points of 10° C., 20° C., 30° C., 40° C., 50° C., 60° C., 70° C. and 80° C., but is not limited thereto and is preferably performed at five points or more.

The average electric resistance value at each temperature is determined as follows. First, the temperature of the temperature sensor element is adjusted to 10° C., this temperature is retained for a certain time (1 hour in Examples), and the average with respect to the electric resistance value for such 1 hour is measured as the average electric resistance value at 10° C. Next, the temperature of the temperature sensor element is sequentially raised from 10° C., the temperature raised is retained for a certain time in the same manner, and the average with respect to the electric resistance value for this certain time is measured as the average electric resistance value at the temperature. Such an operation is performed at each measurement temperature in the same manner. The above operation is defined as one cycle, and is continuously performed for five cycles. Herein, each test at the $2^{nd}$ and later cycles is performed by again adjusting the temperature of the temperature sensor element to 10° C. and performing the same operation as in the $1^{st}$ cycle.

The rate of change r (%) in electric resistance value is calculated according to the following expression with the average electric resistance value R1 at the 1st cycle at 10° C. and the average electric resistance value R5 at the 5th cycle at 10° C.

$$r\ (\%)=100\times(|R1-R5|/R1)$$

A lower rate of change r (%) means higher repeating stability of the electric resistance value exhibited by the temperature sensor element, and the rate of change is preferably 10% or less. The rate of change r is more preferably 8% or less, further preferably 7% or less.

EXAMPLES

Hereinafter, the present invention is further specifically described with reference to Examples, but the present invention is not limited to these Examples at all. In Examples, "%" and "part(s)" representing any content or amount of use are on a mass basis, unless particularly noted.

Production Example 1: Preparation of Dedoped Polyaniline 1

A dedoped polyaniline was prepared by preparing and dedoping a polyaniline doped with hydrochloric acid, as shown in the following [1] and [2].

[1] Preparation of Polyaniline Doped with Hydrochloric Acid

A first aqueous solution was prepared by dissolving 5.18 g of aniline hydrochloride (manufactured by Kanto Kagaku) in 50 mL of water. A second aqueous solution was prepared by dissolving 11.42 g of ammonium persulfate (manufactured by Fujifilm Wako Pure Chemical Corporation) in 50 mL of water.

Next, the first aqueous solution was stirred using a magnetic stirrer at 400 rpm for 10 minutes with the temperature being regulated at 35° C., and thereafter, the second aqueous solution was dropped to the first aqueous solution at a dropping speed of 5.3 mL/min under stirring at the same temperature. After the dropping, a reaction was further allowed to occur for 1 hour with a reaction liquid being kept at 35° C., and thus a solid was precipitated in the reaction liquid.

Thereafter, the reaction liquid was filtered by suction with a paper filter (second kind for chemical analysis in JIS P 3801), and the resulting solid was washed with 200 mL of water. Thereafter, the solid was washed with 100 mL of 0.2 M hydrochloric acid and then 200 mL of acetone, and thereafter dried in a vacuum oven, thereby obtaining a polyaniline doped with hydrochloric acid, represented by the following formula (1).

[Formula 2]

(1)

[2] Preparation of Dedoped Polyaniline

Four g of the polyaniline doped with hydrochloric acid, obtained in [1], was dispersed in 100 mL of 12.5% by mass ammonia water and the resultant was stirred with a magnetic stirrer for about 10 hours, thereby precipitating a solid in a reaction liquid.

Thereafter, the reaction liquid was filtered by suction with a paper filter (second kind for chemical analysis in JIS P 3801), and the resulting solid was washed with 200 mL of water and then 200 mL of acetone. Thereafter, the solid was dried in vacuum at 50° C., thereby obtaining a dedoped polyaniline represented by the following formula (2). The dedoped polyaniline was dissolved in N-methylpyrrolidone (NMP; Tokyo Chemical Industry Co., Ltd.) so that the concentration was 5% by mass, thereby preparing a solution of the dedoped polyaniline (conjugated polymer) 1. Hereinafter, this solution is referred to as "polyaniline solution (1)".

[Formula 3]

(2)

Production Example 2: Preparation of Dedoped Polyaniline 2

A polyaniline doped with hydrochloric acid was prepared in the same manner as in Production Example 1 except that the reaction time after dropping of the second aqueous solution to the first aqueous solution in [1] of Production Example 1 was changed to 2 hours. A solution of dedoped polyaniline 2 was prepared in the same manner as in [2] of Production Example 1 except that the polyaniline doped with hydrochloric acid was used. Hereinafter, this solution is referred to as "polyaniline solution (2)".

Production Example 3: Preparation of Dedoped Polyaniline 3

A polyaniline doped with hydrochloric acid was prepared in the same manner as in Production Example 1 except that the reaction time after dropping of the second aqueous solution to the first aqueous solution in [1] of Production Example 1 was changed to 3 hours. A solution of dedoped polyaniline 3 was prepared in the same manner as in [2] of Production Example 1 except that the polyaniline doped with hydrochloric acid was used. Hereinafter, this solution is referred to as "polyaniline solution (3)".

Production Example 4: Preparation of Dedoped Polyaniline 4

A polyaniline doped with hydrochloric acid was prepared in the same manner as in Production Example 1 except that the reaction time after dropping of the second aqueous solution to the first aqueous solution in [1] of Production Example 1 was changed to 5 hours. A solution of dedoped polyaniline 4 was prepared in the same manner as in [2] of Production Example 1 except that the polyaniline doped with hydrochloric acid was used. Hereinafter, this solution is referred to as "polyaniline solution (4)".

Production Example 5: Preparation of Dedoped Polyaniline 5

A polyaniline doped with hydrochloric acid was prepared in the same manner as in Production Example 1 except that the reaction time after dropping of the second aqueous solution to the first aqueous solution in [1] of Production Example 1 was changed to 10 hours. A solution of dedoped polyaniline 5 was prepared in the same manner as in [2] of Production Example 1 except that the polyaniline doped with hydrochloric acid was used. Hereinafter, this solution is referred to as "polyaniline solution (5)".

Production Example 6: Preparation of Matrix Resin

A powder of polyimide having a repeating unit represented by the following formula (5) was produced using 2,2'-bis(trifluoromethyl)benzidine (TFMB) represented by the following formula (3), as a diamine, and 4,4'-(1,1,1,3,3,3-hexafluoropropane-2,2-diyl)diphthalic dianhydride (6FDA) represented by the following formula (4), as a tetracarboxylic dianhydride, according to the description in Example 1 of International Publication No. WO 2017/179367.

The powder was dissolved in propylene glycol 1-monomethyl ether 2-acetate so that the concentration was 8% by mass, thereby preparing a polyimide solution.

[Formula 4]

(3)

(4)

(5)

Example 1

[1] Preparation of Polymer Composition for Temperature-Sensitive Film

A polymer composition for a temperature-sensitive film was prepared by mixing 1.00 g of polyaniline solution (1), 2.45 g of NMP (Tokyo Chemical Industry Co., Ltd.), 2.50 g of the solution of polyimide as a matrix resin, prepared in Production Example 6, and 0.05 g of (+)-camphorsulfonic acid (Tokyo Chemical Industry Co., Ltd.) as a dopant. The dopant was used in an amount of 1.6 mol based on 1 mol of the dedoped polyaniline.

[2] Production of Temperature Sensor Element

The production procedure of a temperature sensor element is described with reference to FIG. 3 and FIG. 4.

A pair of rectangular Au electrodes of 2 cm in length×3 mm in width was formed on one surface of a glass substrate ("Eagle XG" manufactured by Corning Incorporated) of a 5-cm square by sputtering using Ioncoater ("IB-3" manufactured by Eiko Corporation), with reference to FIG. 3.

The thickness of each of the Au electrodes according to cross section observation with a scanning electron microscope (SEM) was 200 nm.

Next, 200 μL of the polymer composition for a temperature-sensitive film, prepared in [1], was dropped between the pair of Au electrodes formed on the glass substrate, with reference to FIG. 4. A film of the polymer composition for a temperature-sensitive film, formed by the dropping, was in contact with both the electrodes. Thereafter, the film was subjected to a drying treatment at 50° C. under normal pressure for 2 hours and then at 50° C. under vacuum for 2 hours, and thereafter a heat treatment at 100° C. for about 1 hour, thereby forming a temperature-sensitive film and producing a temperature sensor element. The thickness of the temperature-sensitive film was measured with Dektak KXT (manufactured by Bruker), and was 30 μm.

Examples 2 to 4 and Comparative Example 1

Respective polymer compositions for temperature-sensitive films were prepared in the same manner as in Example 1 except that polyaniline solutions (2) to (5) were each used instead of polyaniline solution (1) of Example 1.

Each temperature sensor element was produced in the same manner as in Example 1 except that such each polymer composition for a temperature-sensitive film was used. The thickness of such each temperature-sensitive film was measured in the same manner as in Example 1, and was 30 μm.

Figure 5:
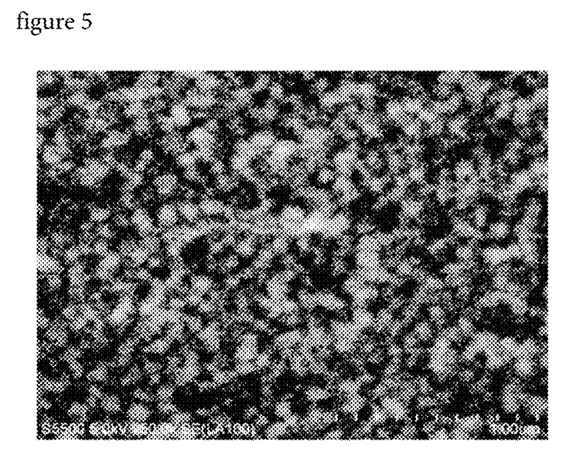
FIG. 5 is a SEM photograph of a temperature-sensitive film included in the temperature sensor element of Example 3.
Figure 6:
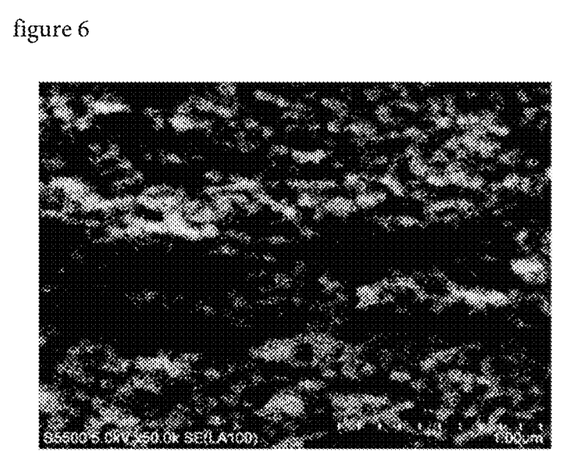
FIG. 6 is a SEM photograph of a temperature-sensitive film included in a temperature sensor element of Comparative Example 1.

FIG. 5 illustrates a SEM photograph imaging a cross section of the temperature-sensitive film in the temperature sensor element produced in Example 3, and FIG. 6 illustrates a SEM photograph imaging a cross section of the temperature-sensitive film in the temperature sensor element produced in Comparative Example 1. A white-photographed portion corresponded to conductive domains dispersed in the matrix resin.

[Measurement of Number Average Molecular Weight and Molecular Weight Distribution of Conjugated Polymer]

The number average molecular weight Mn and the weight average molecular weight Mw of the conjugated polymer (dedoped polyaniline) were measured using gel permeation chromatography (GPC) in the following conditions. The molecular weight distribution (Mw/Mn) was calculated based on the measurement results. The results are shown in Table 1.

A measurement solution was here adopted which was obtained by dissolution in an eluent, as a pre-treatment, and thereafter filtering with a 0.45-μm membrane filter. The concentration of the dedoped polyaniline in the measurement solution was 0.01% by mass.

Apparatus: "8020" manufactured by Tosoh Corporation
Column: TSKgel G1000H×L+G3000H×L+guardcolumnHHR
Eluent: 10 mM LiBr/dimethylformamide
Flow rate: 1.0 mL/min
Detector: RI/UV detector
Column temperature: 40° C.
Amount of injection: 100 μL
Molecular weight standard: standard polystyrene 37900, 39500, 10200, 5060, 2630, 1010, 590

[Calculation of Number of Structural Units in Dedoped Polyaniline]

The number of structural units was calculated according to the following expression.

Number of structural units=Number average molecular weight Mn/Molecular weight of structural unit The molecular weight of a structural unit in each of the dedoped polyanilines was 90.5 with respect to aniline as the structural unit.

[Evaluation of Temperature Sensor Element]

The repeating stability of the electric resistance value exhibited by the temperature sensor element was evaluated by the following test.

The pair of Au electrodes in the temperature sensor element and a digital multimeter ("B35T+" manufactured by OWON Japan) were connected with a lead wire. The temperature of the temperature sensor element was adjusted by use of a Peltier temperature controller ("HMC-10E-0100" manufactured by Hayashi-Repic Co., Ltd.), and the average electric resistance value at each temperature of 10° C., 20° C., 30° C., 40° C., 50° C., 60° C., 70° C. and 80° C. was measured.

The average electric resistance value at each temperature was measured according to the following method. First, the temperature of the temperature sensor element was adjusted to 10° C. by use of the Peltier temperature controller, and this temperature was retained for 1 hour. The average with respect to the electric resistance value for such 1 hour was measured as the average electric resistance value at 10° C. Next, the temperature of the temperature sensor element was adjusted to 20° C., and this temperature was retained for 1 hour. The average with respect to the electric resistance value for such 1 hour was measured as the average electric resistance value at 20° C. The same manner was performed with respect to each temperature other than 10° C. and 20° C., and the average with respect to the electric resistance value for a retention time of 1 hour was measured as the average electric resistance value at such each temperature. The above operation was defined as one cycle.

The test at the $2^{nd}$ cycle was performed by again adjusting the temperature of the temperature sensor element to 10° C. and performing the same operation as in the 1st cycle. Measurement was performed for five cycles with the test being continued.

The rate of change r (%) in electric resistance value was determined according to the following expression with the average electric resistance value R1 at the 1st cycle at 10° C. and the average electric resistance value R5 at the 5th cycle at 10° C. The results are shown in Table 1.

$r\ (\%)=100\times(|R1-R5|/R1)$

TABLE 1

| | Conjugated polymer | | | |
|---|---|---|---|---|
| | Number average molecular weight | Number of structural units | Molecular weight distribution | Rate of change r (%) in electric resistance value |
| Example 1 | 5436 | 60 | 1.16 | 1 |
| Example 2 | 5577 | 62 | 1.17 | 5 |
| Example 3 | 5597 | 62 | 1.17 | 5 |
| Example 4 | 5647 | 62 | 1.18 | 6 |
| Comparative Example 1 | 5932 | 66 | 1.21 | 11 |

REFERENCE SIGNS LIST

100 temperature sensor element, 101 first electrode, 102 second electrode, 103 temperature-sensitive film, 103*a* matrix resin, 103*b* conductive domain, 104 substrate.

The invention claimed is:

1. A temperature sensor element comprising a pair of electrodes and a temperature-sensitive film disposed in contact with the pair of electrodes, wherein
    the temperature-sensitive film comprises a matrix resin and a plurality of conductive domains contained in the matrix resin,
    the conductive domains comprise a conjugated polymer and a dopant, and
    the number of structural units constituting the conjugated polymer is 65 or less.

2. The temperature sensor element according to claim 1, wherein the conjugated polymer is a polyaniline-based polymer.

3. The temperature sensor element according to claim 1, wherein the conjugated polymer has a molecular weight distribution of 1.2 or less.

* * * * *